(12) United States Patent
Hyun

(10) Patent No.: US 9,137,979 B2
(45) Date of Patent: Sep. 22, 2015

(54) FISHING REEL EQUIPPED WITH HANGER FOR FISHHOOK AND FISHING ROD USING THE SAME

(71) Applicant: DOYO ENGINEERING CO., LTD., Bucheon (KR)

(72) Inventor: Kwang-Ho Hyun, Bucheon (KR)

(73) Assignee: DOYO ENGINEERING CO., LTD. (KR)

(*) Notice: Subject to any disclaimer, the term of this patent is extended or adjusted under 35 U.S.C. 154(b) by 231 days.

(21) Appl. No.: 13/705,605

(22) Filed: Dec. 5, 2012

(65) Prior Publication Data

US 2013/0139429 A1  Jun. 6, 2013

(30) Foreign Application Priority Data

Dec. 6, 2011 (KR) .......................... 10-2011-0129517
Nov. 22, 2012 (KR) .......................... 10-2012-0133264

(51) Int. Cl.
    A01K 87/06 (2006.01)
    A01K 97/06 (2006.01)
    A01K 89/00 (2006.01)

(52) U.S. Cl.
    CPC ................. *A01K 97/06* (2013.01); *A01K 87/06* (2013.01); *A01K 89/00* (2013.01)

(58) Field of Classification Search
    CPC ....... A01K 87/06; A01K 87/08; A01K 89/00; A01K 97/06
    USPC .............................. 43/18.1 R, 20, 22, 25, 25.2
    See application file for complete search history.

(56) References Cited

U.S. PATENT DOCUMENTS

| | | | | |
|---|---|---|---|---|
| 802,027 A | * | 10/1905 | Bishop | 43/25 |
| 2,725,660 A | * | 12/1955 | Costley | 43/25 |
| 2,878,610 A | * | 3/1959 | Herstedt | 43/25.2 |
| 3,142,127 A | * | 7/1964 | Mason | 43/19 |
| 3,164,334 A | * | 1/1965 | Gris | 242/323 |
| 3,782,023 A | * | 1/1974 | Hendrickson | 43/25 |
| 3,815,273 A | * | 6/1974 | Perkins | 43/25.2 |
| 4,015,361 A | * | 4/1977 | O'Reilly et al. | 43/25.2 |
| 4,457,095 A | * | 7/1984 | Stevenson | 43/25.2 |
| 5,695,139 A | * | 12/1997 | Murphy | 242/239 |
| 6,070,822 A | * | 6/2000 | Zwayer et al. | 242/310 |
| 6,564,498 B2 | * | 5/2003 | Sawtell | 43/26 |
| 7,191,559 B1 | * | 3/2007 | Laceky | 43/25.2 |
| 7,703,234 B2 | * | 4/2010 | Dodge | 43/25.2 |

FOREIGN PATENT DOCUMENTS

KR    100471571    2/2005

* cited by examiner

*Primary Examiner* — David Parsley
(74) *Attorney, Agent, or Firm* — Cantor Colburn LLP

(57) ABSTRACT

A fishing reel equipped with a fishhook hanger and a fishing rod using the fishing reel. The fishing rod includes a fishing rod body; and a reel body mounted to the fishing rod body, the reel body having a female or male locking part; and a fishhook hanger including a fishhook hanging part for hanging a fishhook thereon, a connection part extending from the fishhook hanging part, and a male or female locking part that extends from the connection part and corresponds to the locking part of the reel body, wherein the female or male locking part and the male or female locking part are configured to be removably locked to each other. The fishing rod further includes a holding unit that can hold a fishline, a fishhook, a sinker connected to the fishline, or a sinker connector that connects the sinker to the fishline.

1 Claim, 17 Drawing Sheets

(a)

(b)

FISHING REEL EQUIPPED WITH HANGER FOR FISHHOOK AND FISHING ROD USING THE SAME

BACKGROUND OF THE INVENTION

1. Field of the Invention

The present invention relates, in general, to a fishing reel equipped with a fishhook hanger and a fishing rod using the fishing reel and, more particularly, to a fishing reel equipped with a fishhook hanger and a fishing rod using the fishing reel, in which both a reel body having a locking part and a fishhook hanger having a fishhook hanging part for hanging a fishhook thereon and a corresponding locking part locked to the locking part of the reel body are used, so that the fishhook hanging part of the fishhook hanger can safely and efficiently hang the fishhook thereon, thereby preventing the fishhook from scratching or damaging the fishing reel and from injuring a user, and realizing an easy and safe handling of the fishing rod while moving the fishing rod or while fishing using the fishing rod, and in which the locking part of the reel body and the corresponding locking part of the fishhook hanger are configured to be removably locked to each other, so that the fishhook hanger can be easily locked to the reel body or can be easily removed from the reel body as desired when using the fishing rod, thereby improving usability of the fishing reel, and in which the locking or unlocking of the locking parts can be easily and simply performed, and the fishing reel has a simple construction, thereby realizing improved productivity of the fishing reel.

2. Description of the Related Art

An example of conventional fishing reels equipped with fishhook hangers is disclosed in Korean Patent No. 10-0471571 (May 5, 2005, hereinbelow, referred to as "the patent document"), entitled "a reel body of a double bearing fishing reel".

The patent document discloses a reel body of a double bearing fishing reel, in which a fishline is wound around a rotating spool. The reel body includes a frame, first and second covers, a front cover, and a fishhook hanger, wherein the frame includes two side plates that are placed outside opposite ends of the spool and a plurality of connectors that connect the two side plates to each other, wherein the first and second covers are placed to cover the outer surfaces of the two side plates, the front cover is placed to cover the front of the frame, with a long horizontal opening being formed in the front cover so as to set therein a fishline guide member of a level winding mechanism, and the fishhook hanger is formed as an arm-shaped member that is placed along the horizontal opening of the front cover at a location outside the front cover at an interval defined between the fishhook hanger and the front cover.

In other words, the patent document was proposed to provide a technique in which a fishhook is hung on a fishhook hanger, thereby preventing the fishhook from scratching or damaging a reel body.

However, the technique disclosed in the patent document is problematic in that the fishhook hanger is configured to be always locked to the reel body so that, when a user intends to grip the fishing reel in various manners while fishing, the fishhook hanger may disturb the user to efficiently grip the fishing reel.

Further, the user may be injured by the fishhook hanger.

Accordingly, it is required keenly to develop a technique that can solve the above-mentioned problems.

RELATED ART DOCUMENT

Patent Document

Korean Patent No. 10-0471571 (May 5, 2005)

SUMMARY OF THE INVENTION

Accordingly, the present invention has been made keeping in mind the above problems occurring in the related art, and the present invention is intended to propose a fishing reel equipped with a fishhook hanger and a fishing rod using the fishing reel, in which both a reel body having a locking part and a fishhook hanger having a fishhook hanging part for hanging a fishhook thereon and a corresponding locking part locked to the locking part of the reel body are used, so that the fishhook hanging part of the fishhook hanger can safely and efficiently hang the fishhook thereon, thereby preventing the fishhook from scratching or damaging the fishing reel and from injuring a user, and realizing an easy and safe handling of a fishing rod while moving the fishing rod or while fishing using the fishing rod, and in which the locking part of the reel body and the corresponding locking part of the fishhook hanger are configured to be removably locked to each other, so that the fishhook hanger can be easily locked to or can be easily removed from the reel body as desired while using the fishing rod, thereby improving usability of the fishing reel, and in which the locking or unlocking of the locking parts can be easily and simply performed, and the fishing reel has a simple construction, thereby realizing improved productivity of the fishing reel.

Further, the present invention is intended to propose a fishing reel equipped with a fishhook hanger and a fishing rod using the fishing reel, in which a locking bolt that locks the frame and an inside cover of the reel body to each other forms a male locking part of the reel body, and a hook or a ring that is combined with the locking bolt forms a corresponding female locking part of the fishhook hanger, so that the present invention does not require an additional element for combining the fishhook hanger with the reel body, thereby reducing the production cost.

Further, the present invention is intended to propose a fishing reel equipped with a fishhook hanger and a fishing rod using the fishing reel, in which the fishhook hanging part of the fishhook hanger is configured such that the fishhook hanging part is bent along the outside of the frame and the location of the fishhook hanging part can be moved, so that the fishhook hanging part does not disturb a user while fishing, thereby improving usability of the product.

In addition, the present invention is intended to propose a fishing reel equipped with a fishhook hanger and a fishing rod using the fishing reel, in which the fishing reel has a female locking part and the fishhook hanger has opposite corresponding male locking parts, wherein the opposite corresponding male locking parts are formed as protrusions that are bend in opposite directions, so that when the fishhook hanger is locked to the reel body, the locking force between the female locking part and the corresponding male locking parts is increased by connection parts, thereby preventing the fishhook hanger from being unexpectedly removed from the reel body.

In order to achieve the above object, according to one aspect of the present invention, there is provided a fishing reel including: a reel body having a female or male locking part; and a fishhook hanger including a fishhook hanging part for hanging a fishhook thereon, a connection part extending from the fishhook hanging part, and a male or female locking part that extends from the connection part and corresponds to the locking part of the reel body, wherein the female or male locking part and the male or female locking part are configured to be removably locked to each other.

In the present invention, the male locking part of the reel body may be a locking bolt that locks a frame and an inside cover of the reel body to each other, and the female locking part of the fishhook hanger may be a hook or a ring that is locked to the locking bolt.

In the present invention, the connection part of the fishhook hanger may be a curved connection part that is bent along the outside of the frame so that a position of the fishhook hanging part can be moved, thereby preventing the fishhook hanging part from disturbing a user while fishing.

In the present invention, the reel body may have a female locking part, and the fishhook hanger may have corresponding male locking parts extending form ends of opposite connection parts of the fishhook hanger, wherein the corresponding male locking parts are formed as protrusion-shaped parts that are bent in opposite directions.

The fishing reel equipped with the fishhook hanger and the fishing rod using the fishing reel according to the present invention are advantageous in that both the reel body having the locking part and the fishhook hanger having the fishhook hanging part for hanging the fishhook thereon and the corresponding locking part locked to the locking part of the reel body are used, so that the fishhook hanging part of the fishhook hanger can safely and efficiently hang the fishhook thereon, thereby preventing the fishhook from scratching or damaging the fishing reel and from injuring a user, and realizing an easy and safe handling of the fishing rod while moving the fishing rod or while fishing using the fishing rod.

Further, in the present invention, the locking part of the reel body and the corresponding locking part of the fishhook hanger are configured to be removably locked to each other, so that the fishhook hanger can be easily locked to or can be easily removed from the reel body as desired while using the fishing rod, thereby improving usability of the fishing reel. In addition, the locking or unlocking of the locking parts can be easily and simply performed, and the fishing reel has a simple construction, thereby realizing improved productivity of the fishing reel.

Further, in the present invention, the locking bolt that locks the frame and the inside cover of the reel body to each other forms the male locking part of the reel body, and the hook or the ring that is combined with the locking bolt forms the corresponding female locking part of the fishhook hanger, so that the present invention does not require an additional element for combining the fishhook hanger with the reel body, thereby reducing the production cost.

Further, in the present invention, the fishhook hanging part of the fishhook hanger is configured such that the fishhook hanging part is bent along the outside of the frame and the location of the fishhook hanging part can be moved, so that the fishhook hanging part does not disturb a user while fishing, thereby improving usability of the product.

Further, in the present invention, the fishing reel has the female locking part and the fishhook hanger has the opposite corresponding male locking parts, wherein the opposite corresponding male locking parts are formed as the protrusions that are bend in opposite directions, so that when the fishhook hanger is locked to the reel body, the locking force between the female locking part and the corresponding male locking parts is increased by the connection parts, thereby preventing the fishhook hanger from being unexpectedly removed from the reel body.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

Hereinbelow, a fishing reel equipped with a fishhook hanger and a fishing rod using the fishing reel according to the present invention will be described with reference to the accompanying drawings.

The directional terms disclosed in the following description will be referred to as follows, based on the plan view of FIG. 4.

The directional term related to a side in which a foot of the fishing reel according to the present invention is provided will be referred to as "lower" or "downward", and the term related to a side opposite to the foot will be referred to as "upper" or "upward".

Further, the term related to a side in which a fishline guide member is provided will be referred to as "front" or "forward" and the term related to a side having a spool will be referred to as "back" or "backward".

Further, the term "hanging action" disclosed in the following description includes an action in which a fishhook is naturally hung on the fishhook hanger by winding the fishline on the spool, in addition to an action in which the fishhook is simply and manually hung on the fishhook hanger.

As shown in FIG. 1 to FIG. 6, FIG. 9 and FIG. 10, the fishing reel equipped with the fishhook hanger and the fishing rod using the fishing reel according to the present invention includes: a reel body R provided with a female or male locking part ua; and a fishhook hanger 120 that includes a fishhook hanging part 121 for hanging a fishhook thereon, a connection part 123 extending from the fishhook hanging part 121, and a male or female locking part ub extending from the connection part 123 and corresponding to the locking part ua of the reel body R, wherein the female or male locking part ua and the male or female locking part ub are configured to be removably locked to each other.

Figure 9:
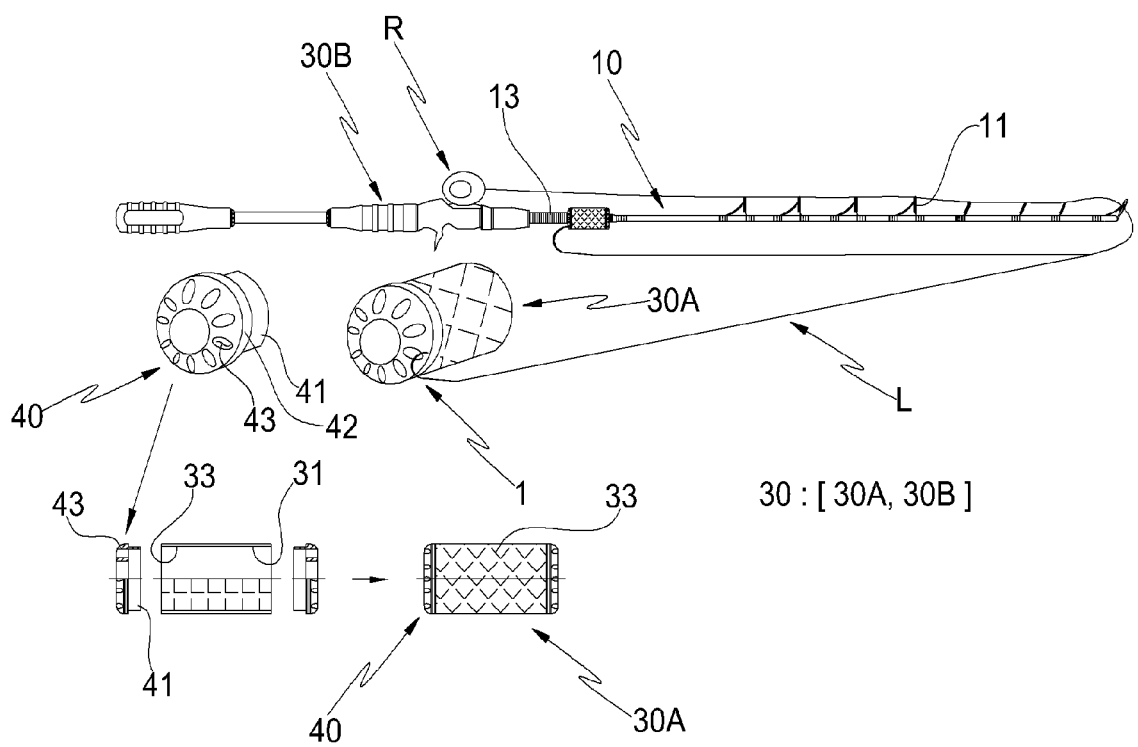
FIGS. 9 and 10 each illustrate a fishing rod according to the present invention in a side view, a perspective view and a sectional view.
Figure 10:
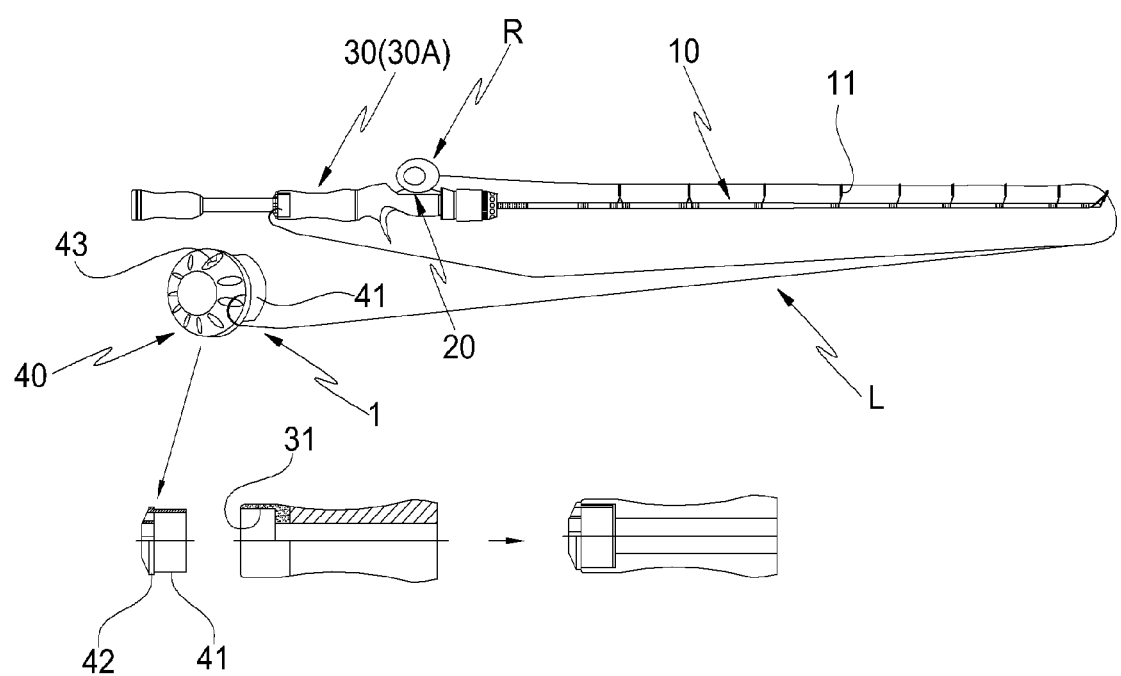

As shown in FIGS. 9 and 10, in the fishing reel equipped with the fishhook hanger and the fishing rod using the fishing reel according to the present invention, a fishing rod body includes: a hand grip 30 and an elastic rod part 10 extending from the hand grip 30.

As shown in FIGS. 9 and 10, the elastic rod part 10 forms the body of the fishing rod and has a telescopic structure consisting of pieces that slide one within another.

In other words, the elastic rod part 10 is made of a material having excellent elasticity, such as carbon graphite, glass fiber, a hybrid material or bamboo. Here, the above-mentioned materials that have excellent elasticity and can be used as a material of the fishing rod have respective intrinsic merits and demerits, so that an optimum material may be selected as the material of the fishing rod according to the type, use and size of a desired fishing rod.

Further, the elastic rod part 10 may consist of one piece or several pieces. When the elastic rod part 10 consists of several pieces, the pieces form a telescopic structure in which the pieces that slide one within another and are thus capable of being extended or shortened.

The elastic rod part 10 has a plurality of fishline guides 11 so that a fishline L passes through the fishline guides 11 and is guided by the fishline guides 11.

Further, as shown in FIGS. 9 and 10, a reel seat 20 is provided on the elastic rod part 10 or is provided on the hand grip 30 so that the reel seat 20 seats and fixes the reel body R having the fishline L on the fishing rod.

Here, it is preferred that the reel seat 20 be configured to easily seat the fishing reel on the fishing rod by a one-touch seating manner or a snap seating manner.

Further, it is preferred that the reel seat 20 be variously designed according to the type and size of the fishing reel or it is preferred that the reel seat 20 be designed such that the location of the reel can be changed according to the type and size of the reel, thereby realizing improved use efficiency of the fishing rod.

As shown in FIGS. 9 and 10, the hand grip 30 is mounted to the butt of the elastic rod part 10 so that a user can hold the hand grip 30. Accordingly, the hand grip 30 functions to improve the use efficiency of the fishing rod.

The hand grip 30 that is provided in the butt of the elastic rod part 10 may be placed in front of the reel seat 20, in back of the reel seat 20, or in front and back of the reel seat 20.

Further, to give a comfortable grip touch to the user and to prevent slip of the hand grip 30 when the user holds the hand grip 30, it is preferred that the hand grip 30 be made of a material having both predetermined elasticity and a high coefficient of friction.

Further, to enhance the slip resistant function of the hand grip 30, the hand grip 30 may have an antislip part 33, such as an embossed or rugged surface. In this case, due to the antislip part 33, the slip resistant effect of the hand grip 30 can be improved.

Further, in the hand grip 30, a part that is placed in back of the reel seat 20 is preferably configured to be adjustable in the position thereof.

To realize the position adjustable structure of the hand grip part that is placed in back of the reel seat 20, an externally threaded part 13 is formed around the outer circumferential surface of an end of the elastic rod part 10, and the hand grip 30 is formed as a cylindrical body, with an internally threaded part being formed around the inner circumferential surface of the cylindrical hand grip 30 so as to correspond to the externally threaded part 13.

Accordingly, due to the engagement of the threaded part 13 with the corresponding threaded part of the hand grip 30, the hand grip 30 can move along the elastic rod part 10, so that the user can adjust the position of the hand grip 30 on the fishing rod and can efficiently use the fishing rod after changing the position of the hand grip to a most convenient position specified to the user.

As shown in FIGS. 1 to 6, in the fishing reel equipped with the fishhook hanger and the fishing rod using the fishing reel according to the present invention, the reel body R is mounted to the reel seat 20 of the fishing rod and releases the fishline from a spool 102 or winds the released fishline onto the spool 102.

The reel body R includes two side covers 101 that are provided in opposite sides of the reel body R.

The spool 102, on which a fishline is wound, is rotatably installed between the two side covers 101.

Further, a fishline guide member 103 is provided at a location in front of the spool 102. Here, the fishline guide member 103 is connected to the two side covers 101 and can guide the fishline in a state in which the fishline guide member 103 moves to the left and right, thereby preventing the fishline from being entangled.

Further, one of the two side covers 101 is provided with a drag 104 that is connected to the spool 102. The drag 104 has a plurality of handles 104a so that a user can wind or unwind the fishline onto or from the spool 102 by manipulating the drag 104 while holding a handle 104a.

Further, a foot 105 is provided at a location below the two side covers 101 so that the reel body R can be mounted to the fishing rod by seating the foot 105 on the reel seat 20.

Figure 1:
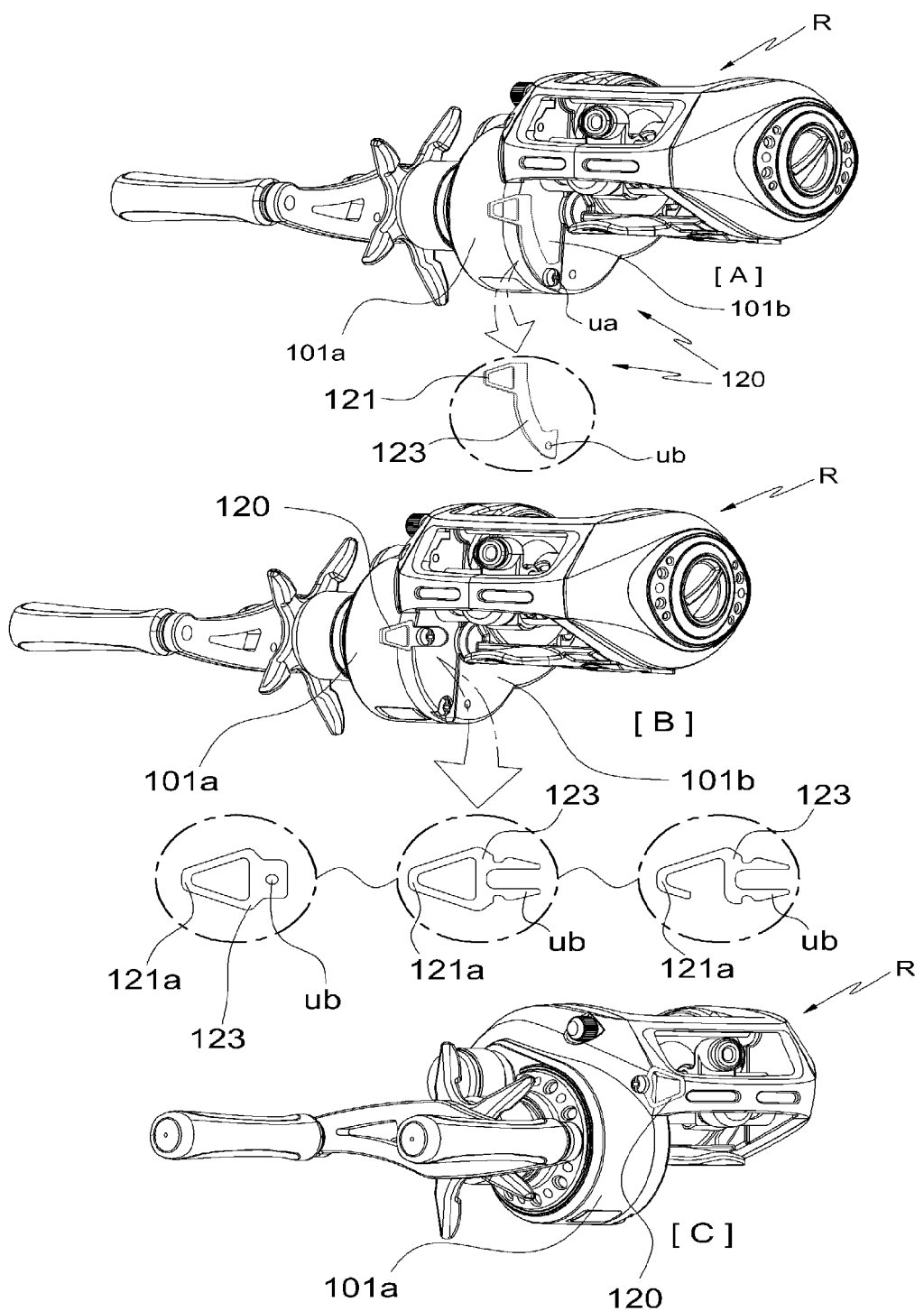
FIGS. 1A to 1C illustrates a reel body and a fishhook hanger of a fishing rod according to the present invention in perspective views.

As shown in FIG. 1, in the fishing reel equipped with the fishhook hanger and the fishing rod using the fishing reel according to the present invention, a locking part ua is formed in the reel body R and another locking part ub is formed in the fishhook hanger 120 so that the two locking parts function to mount the fishhook hanger 120 to the reel body R.

Here, the locking part ua of the reel body R is a male locking part which is formed as a locking bolt that locks a frame 101a and an inside cover 101b to each other. The locking part ub of the fishhook hanger 120 is a female locking part which is formed as a hook or a ring that is locked to the locking bolt, so that the fishhook hanger 120 can be mounted to the reel body by locking the female locking part ub to the locking bolt ua when the inside cover 101b is mounted to the frame 101a.

Here, when the fishhook hanging part 121 of the fishhook hanger 120 is placed at a location below the locking bolt, the fishhook hanging part 121 may disturb the user while fishing. To prevent the fishhook hanging part 121 from disturbing the user while fishing, the fishhook hanging part 121 of the fishhook hanger 120 can be moved to an appropriate position by controlling the connection part 123. Here, the movement of the fishhook hanging part 121 to an appropriate position can be realized by controlling the length of the connection part 123.

Further, the connection part 123 is formed as a curved connection part that is bent along the outside of the frame 101a, so that when the spool 102 is rotated, the fishline can be prevented from being entangled by the fishhook hanger and the fishhook hanger can be prevented from protruding outside the frame 101a of the reel body R, thereby preventing the fishhook hanger from disturbing the user while fishing using the fishing rod or moving the fishing rod.

Further, the reel body R may include a female locking part ua.

In this case, the fishhook hanger 120 includes male locking parts ub at ends of opposite connection parts 123 so as to correspond to the female locking parts ua. Here, the opposite male locking parts ub are formed as protrusion-shaped parts that are bent outward in opposite directions.

The locking part ub shown in FIG. 1A is configured as a ring-shaped female locking part. However, it should be understood that the ring-shaped structure of the locking part is an example of the locking part ub. In other words, the locking part of the present invention may be configured as a female locking part ub, which has a ring-shaped structure or another structure, or may be configured as a male locking part ub corresponding to a female locking part.

Described in detail, when the locking part is formed as a male locking part ub as shown in FIGS. 1B and 1C, the male locking part ua may be formed as a locking bolt that is provided at a location in the lower part of the inside cover or by another locking bolt that is provided at another location. In the above case, the length of the connection part 123 can be determined such that the fishhook hanger does not disturb the user while fishing. Further, the shape of the female locking part ub corresponding to the male locking part ua can be variously designed.

Further, the shape of the fishhook hanging part 121 of the female locking part ub may be designed as a closed-type part or an open-type part. The closed-type fishhook hanging part 121 can more efficiently prevent the fishhook from being undesirably removed from the fishhook hanging part when compared to the open-type fishhook hanging part 121a. However, the open-type fishhook hanging part is advantageous in that the fishhook hanging part can more easily hang or remove the fishhook thereon or therefrom using an open mouth of the fishhook hanging part.

Figure 2:
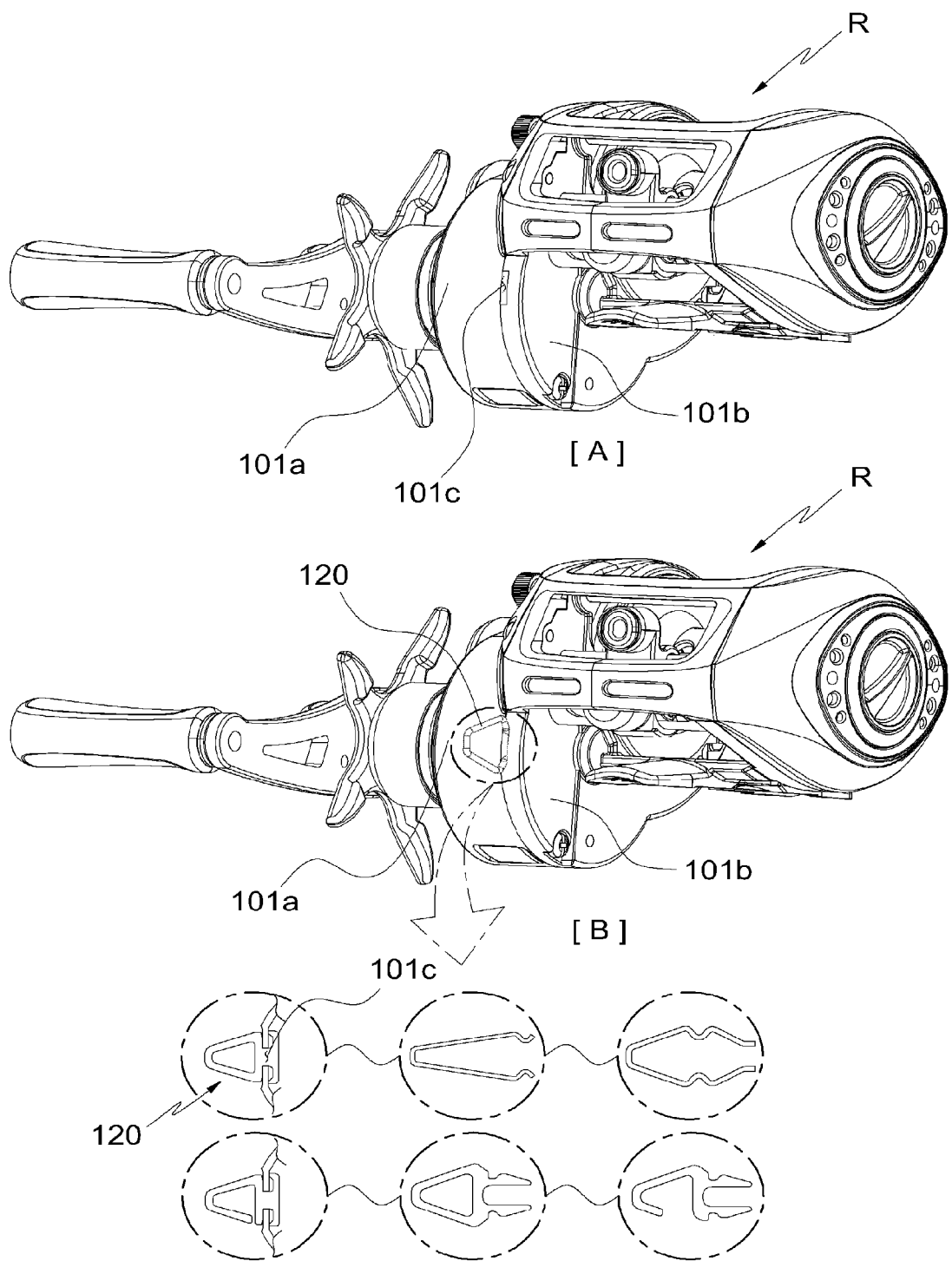
FIGS. 2A to 2B and FIGS. 3A to 3B illustrate modifications of the fishhook hanger of the reel body according to the present invention in perspective views.
Figure 3:
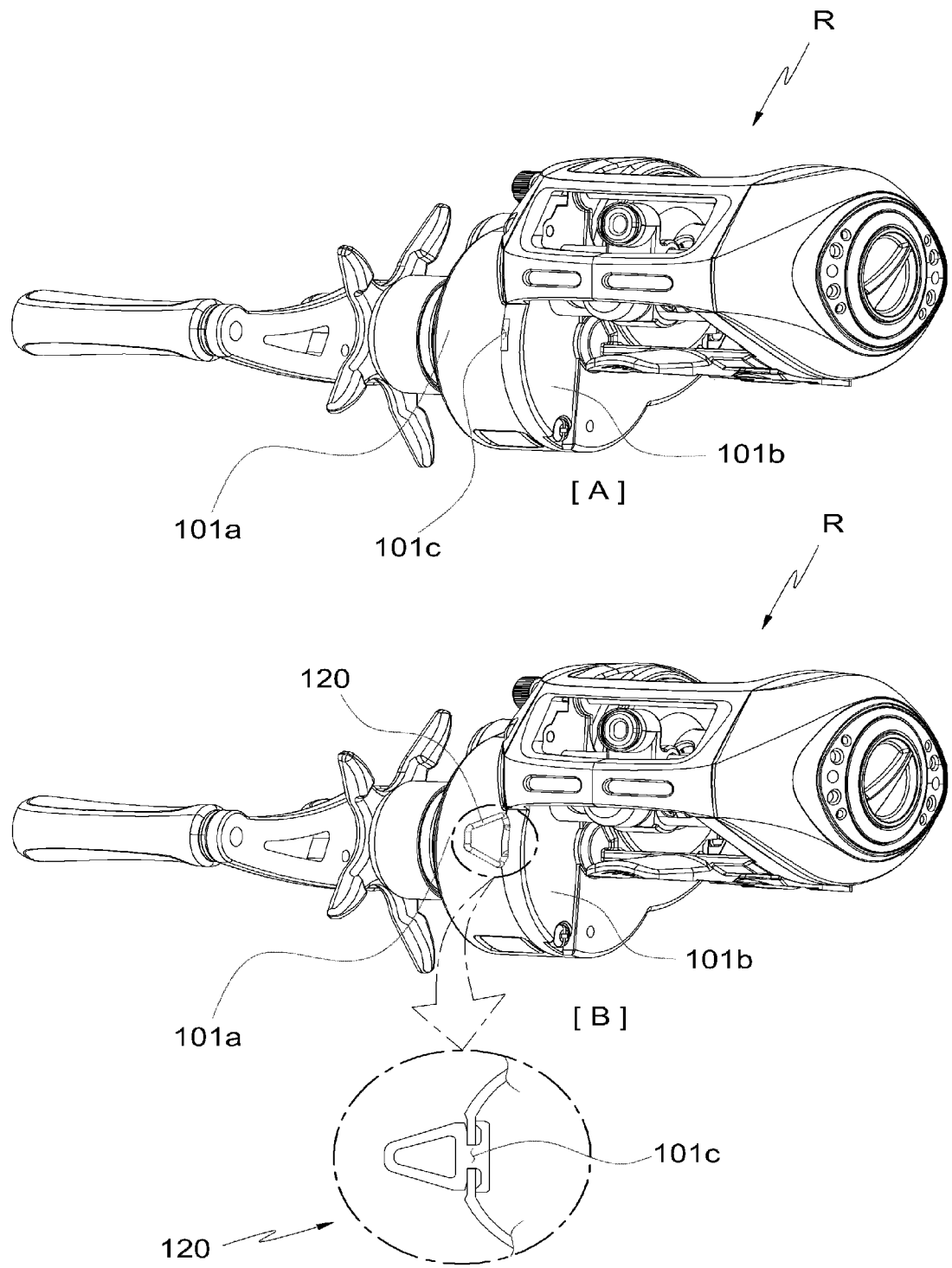

Further, as shown in FIG. 2, the male locking part of the reel body R may be configured as an insert slot 101c that is formed at a location between the inside cover 101b and the frame 101a, instead of the locking bolt, so that the female locking part of the fishhook hanger can be locked to the insert slot 101c.

Here, the connection part 123 of the fishhook hanger 120 corresponding to the insert slot 101c may be variously configured.

As shown in FIG. 2B, when the connection part 123 has the female locking part ub that is locked to the insert slot 101c, the female locking part may be designed such that it can be easily locked to or easily removed from the insert slot 101c using the elasticity of the connection part 123. Alternatively, the female locking part may be configured such that it can be locked to the male locking part ub using a fixture instead of using the elasticity of the connection part.

When the locking part is configured such that it uses the elasticity, it is easy to lock or remove the fishhook hanger 120 to or from the reel body. However, when the locking part is configured such that it uses the fixture, it is easy to produce the fishing reel having the fishhook hanger. Further, the fishhook hanging part 121 may be designed to have a variety of shapes in the same manner as that described above. FIG. 2B illustrates various modifications of the fishhook hanging part 121 and the connection part 123. Of course, it should be understood that further modifications may be realized by a combination of the modifications shown in FIG. 2B.

Figure 4:
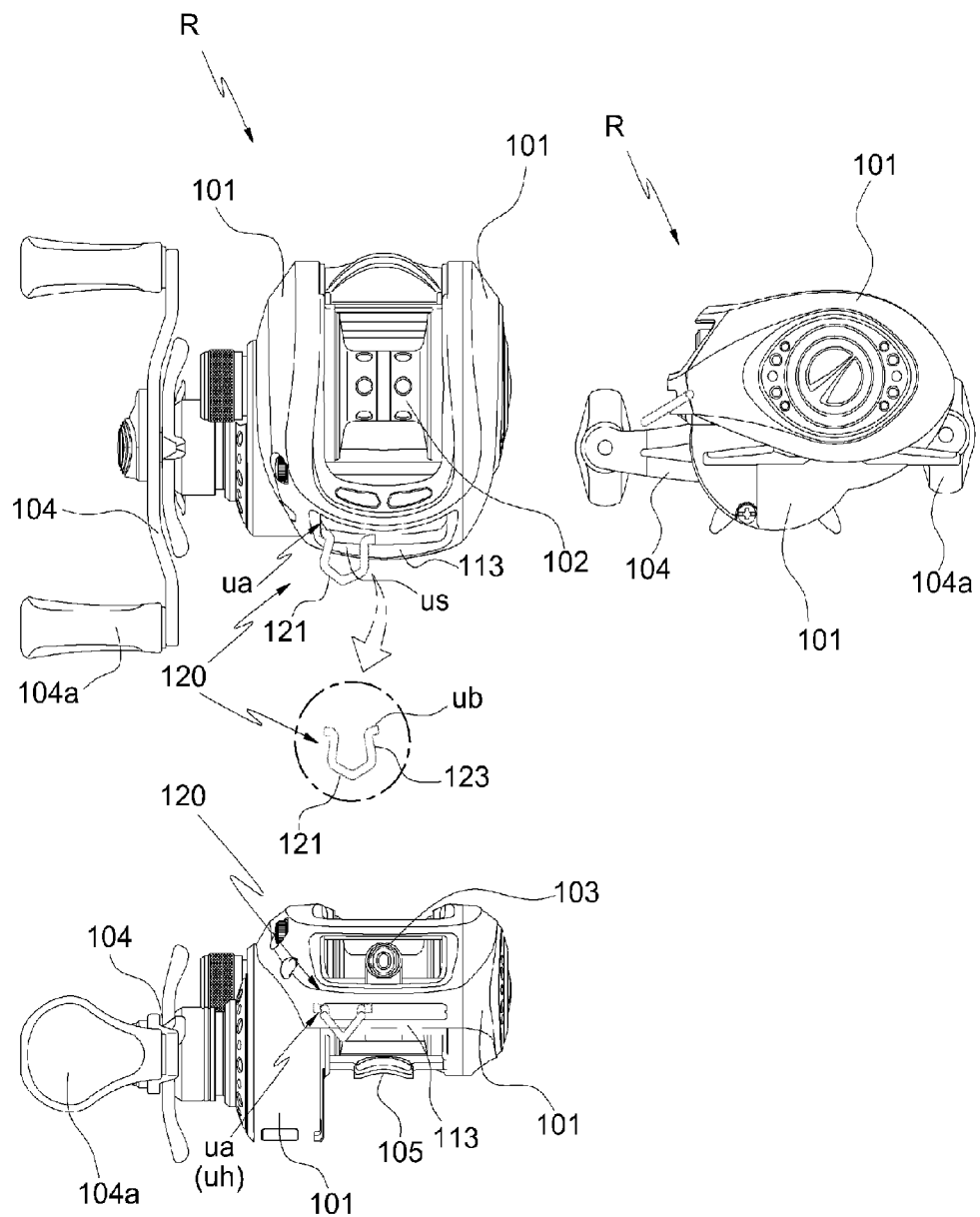
FIGS. 4 to 6 each illustrate a modification of the reel body and the fishhook hanger of the fishing rod according to the present invention in a plan view, a front view and a side view.
Figure 5:
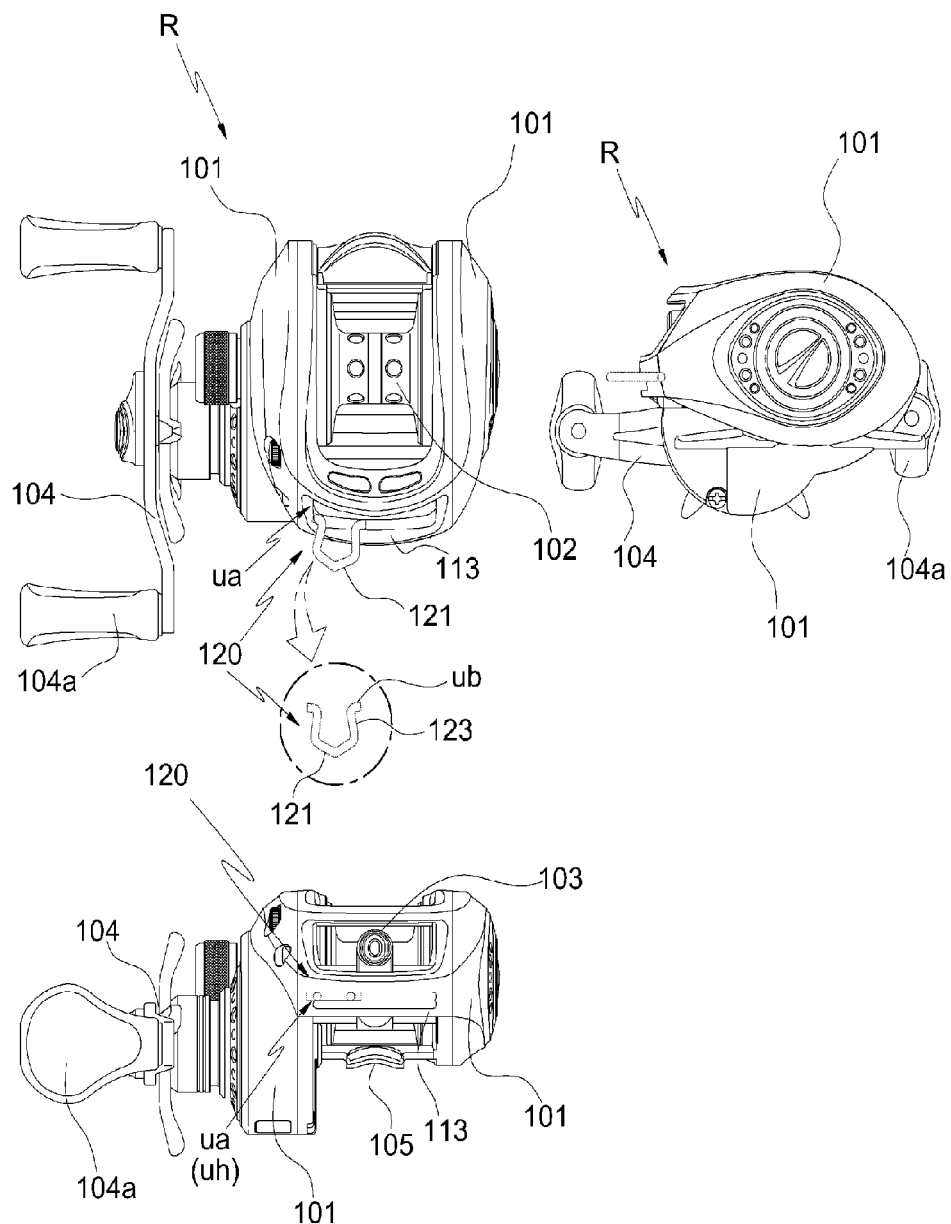
Figure 6:
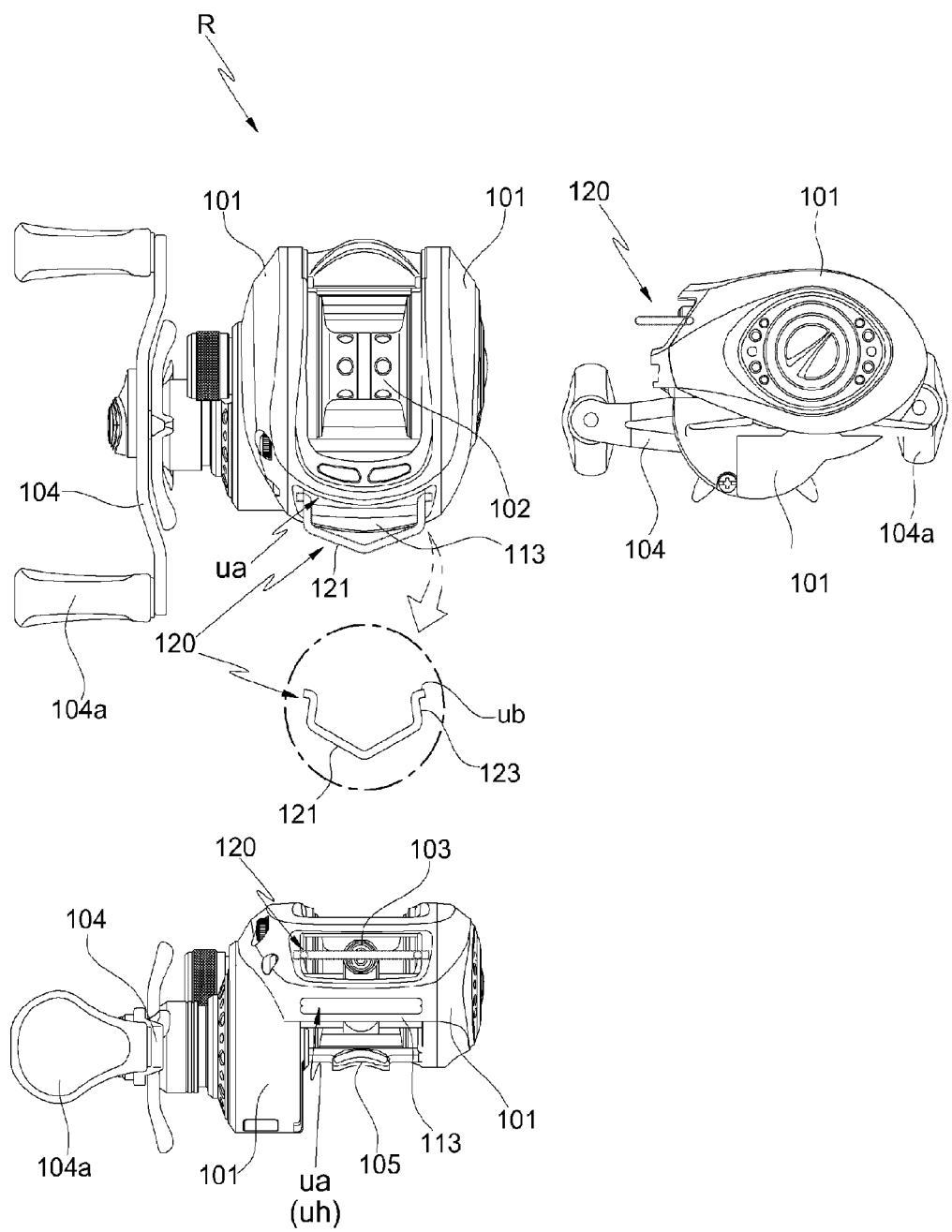

Further, as shown in FIGS. 4 to 6, the locking part ua may be formed on a side cover 101.

Here, the locking part ua may be configured as a female or male locking part.

When the locking part ua is configured as a female locking part, the female locking part may be formed as a locking slot that is formed in the inner surface of each of the side covers 101.

However, when the locking part ua is configured as a male locking part, the male locking part may be formed as a locking protrusion that is formed on the inner surface of each of the side covers 101.

As shown in FIGS. 4 to 6, the size of the locking part ua may be determined to be equal to the size of the inner surface of each of the side covers 101 so that the locking part is formed on the whole of the inner surface of each of the side covers. However, to prevent the fishhook hanger from disturbing the user while fishing, it is preferred that the size of the locking part be determined to be smaller than the size of the inner surface of each of the side covers 101 so that locking part is formed on a part of each of the side covers.

Further, in the drawings, the locking part ua is configured as a female locking part that is formed as a locking slot.

However, it should be understood that the female locking part ua that is formed as a locking slot is an example of the locking part ua, and the locking part ua may be variously designed such that the locking part ua forms a locking protrusion or another shape.

Further, as shown in FIGS. 4 to 6, the locking part ua of the reel body is provided with a support 113 that is connected to the front of each of the side covers 101.

When the connection part 123 of the fishhook hanger 120 is locked to the locking part ua, the support 113 supports the fishhook hanging part 121 or the connection part 123 of the fishhook hanger 120.

Further, the support 113 is provided with a horizontal locking hole uh so that the locking part ub of the fishhook hanger 120 can be locked to the locking part ua after passing through the locking hole uh.

Here, the locking hole uh may be designed such that it has a rectangular shape and comprises one locking hole or two locking holes that are arranged horizontally side by side.

Further, as shown in FIG. 5, locking holes uh of the support 113 may be arranged in a vertical direction. Here, the locking holes uh are configured such that the upper end of a lower locking hole uh and the lower end of an upper locking hole uh are open so that the open ends of the locking holes uh can communicate with each other.

Support protrusions us are formed in opposite sides of each of the locking holes uh so that when the male locking parts ub are inserted into the upper locking hole uh, the support protrusions us support the connection parts 123.

In the above state, when the male locking parts ub are inserted into the upper locking hole uh, the lower locking hole uh forms a space that can allow the connection parts 123 to be rotated downward in the locking part ua. Accordingly, the fishhook hanging part 121 is inclined downward so that the fishhook that is hung on the fishhook hanging part 121 can be moved downward along the inclined fishhook hanging part 121 so as to reach a bent portion of the fishhook hanging part 121.

Here, the locking part ua may be formed in front of the reel body R, that is, in front of the fishline guide member 103. Alternatively, the locking part ua may be formed in an upper part of the reel body R or may be formed in another part of the reel body R.

Preferably, as shown in FIG. 6, when the user fishes using the fishing rod in which the locking part ua is placed in front of the reel body R, the locking part ua, particularly, the support 113 is preferably prevented from disturbing the reel grip action of the user.

As shown in FIGS. 1 to 6, in the fishing reel equipped with the fishhook hanger and the fishing rod using the fishing reel according to the present invention, the fishhook hanger 120 is removably locked to the locking part ua of the reel body R so that the fishhook connected to the fishline can be hung on the fishhook hanger 120.

The fishhook hanger 120 may be made of metal or a plastic material having a predetermined strength so that the fishhook hanger 120 forms a bar-shaped structure.

Further, the fishhook hanging part 121 of the fishhook hanger 120 may be bent at a center thereof so that the fishhook hanging part 121 forms a V-shaped appearance.

Alternatively, the fishhook hanging part 121 may be configured to form a round shape or a straight shape in addition to the above-mentioned V-shaped appearance.

However, to form the fishhook hanging part 121 as an elastic part, it is preferred that the fishhook hanging part 121 be formed as a non-rectilinear part, such as a V-shaped part or a round part.

Further, as shown in FIG. 1 and FIG. 2, the male locking part ub may be variously formed according to the shape of the female locking part ua.

When the female locking part ua is formed as an insert slot 101c that is formed in the inner surface of the side cover, the male locking part is formed as protrusions that are formed by bending outward the ends of the connection parts 123 extending from opposite ends of the fishhook hanging part 121.

In the above case, the protrusions form the male locking part ub that corresponds to the female locking part ua so that the male locking part ub can be inserted into the female locking part ua.

Further, the connection parts 123 apply elasticity to the opposite male locking parts ub so that the opposite male locking parts ub can be biased outward in opposite directions.

Therefore, the male locking parts ub are elastically biased outward.

Accordingly, when the male locking parts ub are inserted into the female locking parts ua of the reel body R, the male locking parts ub are elastically biased outward by the connection parts 123 so that the locking force between the female and male locking parts ua and ub can be increased, thereby preventing the fishhook hanger 120 from being removed undesirably from the reel body R.

Further, when the locking part is formed as a protrusion-shaped male locking part which is not shown in the drawings, the locking part corresponding to the protrusion-shaped male locking part is formed as a female locking part ua.

Here, a groove may be formed on the protrusion-shaped male locking part so that when the male locking part ub is inserted into the female locking part ua, the fishhook hanger 120 can be prevented from being undesirably removed from the reel body R.

Particularly, the locking part of the fishhook hanger 120 is configured such that it can be removably locked to the locking part ua of the reel body.

In the above state, the fishhook hanging part 121 or the connection part 123, or both the fishhook hanging part 121 and the connection part 123 are preferably formed as an elastic part so that the male locking parts ub of the fishhook hanger can be removably locked to the locking part ua of the reel body.

Here, when the fishhook hanging part 121 is formed as a straight part, the fishhook hanging part 121 may fail to have desired elasticity.

Accordingly, the connection parts 123 are bent from opposite ends of the fishhook hanging part 121 so as to form a predetermined length so that the connection parts 123 have desired elasticity.

When the fishhook hanging part 121 is formed as a non-rectilinear part, both the fishhook hanging part 121 and the connection parts 123 have elasticity.

To removably lock the fishhook hanger 120 to the fishing reel R, a user compresses the fishhook hanger 120 inward while holding the fishhook hanging part 121 or holding the connection parts 123 with fingers, thereby closing the connection parts 123 inward.

In the above state, the male locking parts ub are inserted into the locking hole uh of the support 113 so that the male locking parts ub can be aligned with the locking part ua of the reel body. After inserting the male locking parts ub into the locking hole uh so that the male locking parts ub are aligned with the locking part ua, the finger pressure is removed from the fishhook hanger 120 so that the fishhook hanging part 121 or the connection parts 123 are opened and the male locking parts ub are locked to the locking part ua of the reel body.

Further, to remove the male locking parts ub from the locking part ua, the user compresses the fishhook hanging part 121 or the connection parts 123 inward with fingers so that the male locking parts ub can be removed from the locking part ua of the reel body.

In the above state, the connection parts 123 and the male locking parts ub are removed from the locking hole uh of the support 113 so that the fishhook hanger 120 can be removed from the locking part ua of the reel body R.

Figure 7:
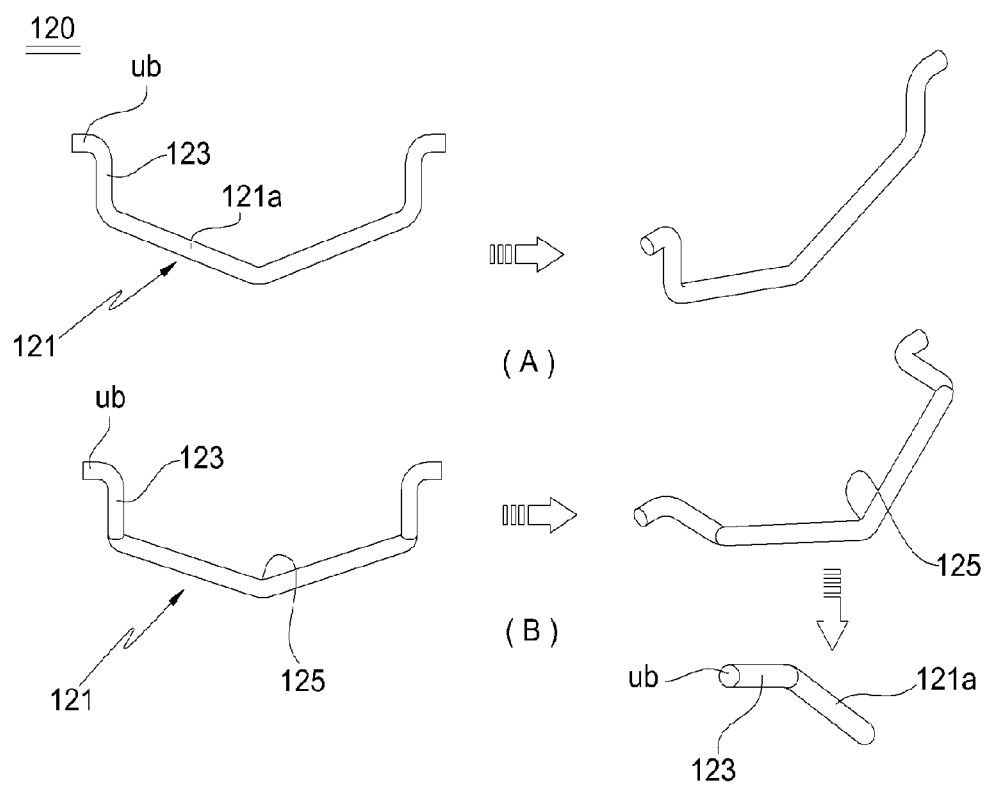
FIGS. 7A to 7B and FIGS. 8A to 8B each illustrate modifications of the fishhook hanger of the fishing rod according to the present invention in plan views and perspective views.

Further, as shown in FIG. 7A, the fishhook hanging part 121 of the fishhook hanger 120 includes inclined portions 121a and an angled hanging portion 125 that is formed between the inclined portions 121a at the center of the fishhook hanging part 121 so that the fishhook can slide down along an inclined portion 121a so as to be held by the angled hanging portion 125 by a hanging action.

In other words, the hanging portion 125 is integrally connected to opposite inclined portions 121a and is angled to form a predetermined angle so that, when a user winds the fishline using the spool after hanging the fishhook on the fishhook hanging part 121, the fishhook is tensioned and slides down along an inclined portion 121a until the fishhook is held by the hanging portion 125.

Accordingly, the fishhook can be naturally and stably held by the hanging portion 125 by a hanging action and can be prevented from being undesirably moved so that the user can easily and safely handle the fishhook.

FIG. 7B illustrates a fishhook hanger in which the fishhook hanging part 121 is bent downward from the connected points at which the fishhook hanging part 121 is connected to the connection parts 123.

In the above case, when a fishhook is hung on the fishhook hanging part 121, the fishhook can naturally slide along an inclined portion 121a of the fishhook hanging part 121 due to the weight of the fishhook, so that the fishhook can be naturally held by the hanging portion 125.

Figure 8:
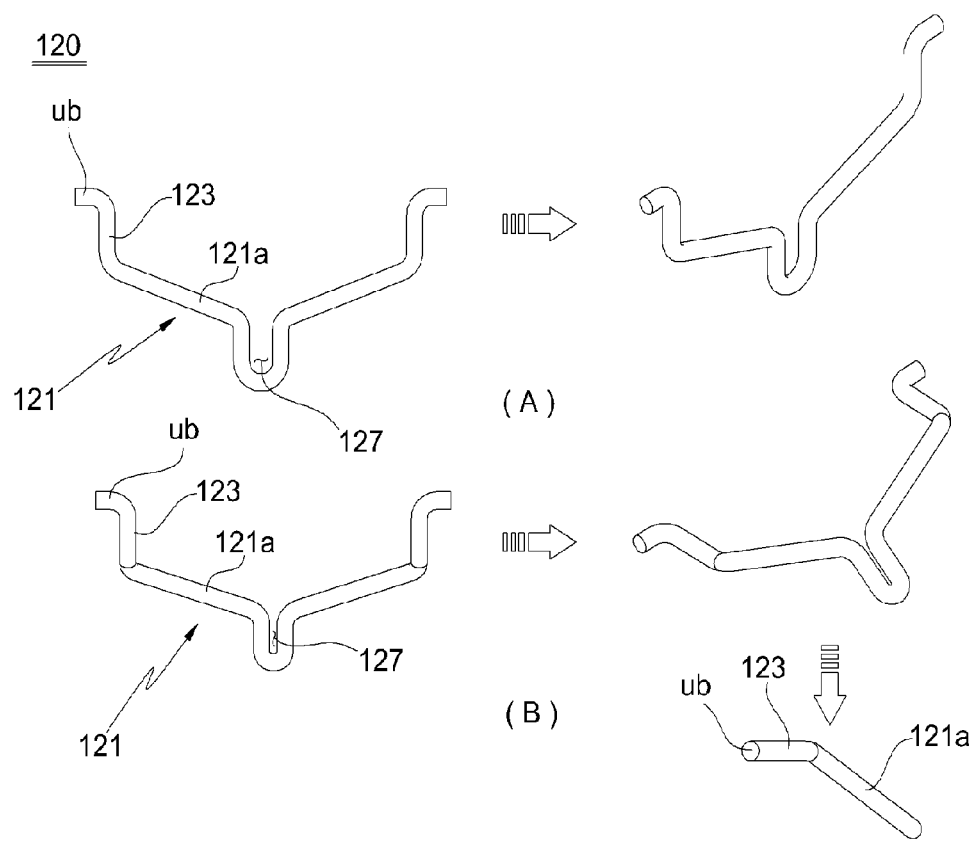

Further, as shown in FIG. 8A, the fishhook hanging part 121 of the fishhook hanger 120 may include a bay part 127 that extends downward from the hanging portion 125.

In the above case, a fishhook can slide along an inclined portion 121a so as to reach the hanging portion 125, and can be held in the bay part 127 by a hanging action.

In other words, the bay part 127 is formed as a U-shaped part, the width of which is narrow so that the bay part 127 can stably hold the fishhook, thereby preventing the fishhook from being undesirably moved in the bay part 127 or from being undesirably removed from the bay part 127 when the user moves the fishing rod. Accordingly, this fishhook hanger 120 can improve operational reliability of the product.

Further, in the fishhook hanger 120 shown in FIG. 8B, the fishhook hanging part 121 is bent downward from the connected points at which the fishhook hanging part 121 is connected to the connection parts 123 in the same manner as that described for FIG. 7B.

In this case, when a fishhook is hung on the fishhook hanging part 121, the fishhook can naturally slide along an inclined portion 121a of the fishhook hanging part 121 so as to reach the hanging portion 125 due to the weight of the fishhook, so that the fishhook can be naturally held in the bay part 127.

Further, the fishhook hanging part 121 may be configured such that the fishhook hanging part 121 becomes inclined downward. In this case, even when a fishhook is simply hung on the fishhook hanging part 121, the fishhook can naturally slide along an inclined portion 121a of the fishhook hanging part 121 so as to be held by the hanging portion 125 or held in the bay part 127 due to the weight of the fishhook.

To this end, when the locking holes uh are formed in the upper and lower sides of the support 113 as shown in FIG. 5, the fishhook hanging part 121 can be inclined at a predetermined angle by rotating the connection parts 123 downward in the locking part ua using the lower locking hole uh that forms a space.

In this case, a fishhook that is hung on the fishhook hanging part 121 slides down along the inclined portion of the fishhook hanging part 121 due to the weight of the fishhook, so that the fishhook can be naturally held by the hanging portion 125 or held in the bay part 127. Accordingly, it is not required to manually control the position of the fishhook in the fishhook hanger by a user.

FIG. 6 illustrates a modification of the present invention in which the location of the fishhook hanger 120 is modified.

In this case, the fishhook hanger 120 is placed at a location which is higher than those of the fishhook hangers of FIGS. 4 and 5. The fishhook hanger 120 is placed in front of the fishline guide member 103.

Here, the locking part (not shown) is placed in the inner surfaces of the side covers 101 of the reel body so that the male locking parts ub of the fishhook hanger 120 can be removably locked to the locking parts of the fishing reel.

In other words, the fishhook hanger 120 of the present invention can be removably locked to various locations in the reel body R so that the present invention allows the user to easily and efficiently use the fishing reel and the fishing rod in a state in which the fishhook hanger 120 is locked to a desired position according to the using type of the fishing rod or according to the size and grip manner of the fishing reel.

In the present invention, it should be understood that the modifications of the fishhook hanger 120 shown in FIGS. 1 to 6 are examples of various modifications of the present invention.

Further, the fishing rod of the present invention includes a holding unit 40 that can selectively hold a fishline L connected to the reel body R, a fishhook 1 connected to the fishline L, another part of the fishline L placed at a location adjacent to the fishhook 1, a sinker 3 connected to an end of the fishline L, and a sinker connector that connects the sinker 3 to the fishline L, or can hold all of the above-mentioned elements.

As shown in FIGS. 9 and 10, the holding unit 40 of the present invention includes a holding part 41 corresponding to a holding part 31 of the hand grip 30, a support member 42 connected to the holding part 41, and fishhook holding holes 43 that are radially formed in the support member 42 and hold the fishhook 1 therein.

Here, the hand grip 30 comprises a first grip 30A and a second grip 30B which are placed in front and back of the reel seat 20. The holding unit 40 is provided on at least one of the first and second grips 30A and 30B.

Each of the first and second grips 30A and 30B has a cylindrical shape, with the holding part 31 being formed in at least one of ends of the first and second grips 30A and 30B. Here, the holding part 41 of the holding unit 40 may be forcibly fitted into the holding part 31 or may be locked to the holding part 31 using a locking bolt, so that the holding unit 40 can be mounted to the hand grip 30.

When a user moves the fishing rod in a state in which the fishhook 1 is held in a fishhook holding hole 43, the fishhook holding hole 43 efficiently holds the fishhook 1, thereby allowing the user to easily and safely move the fishing rod.

Figure 11:
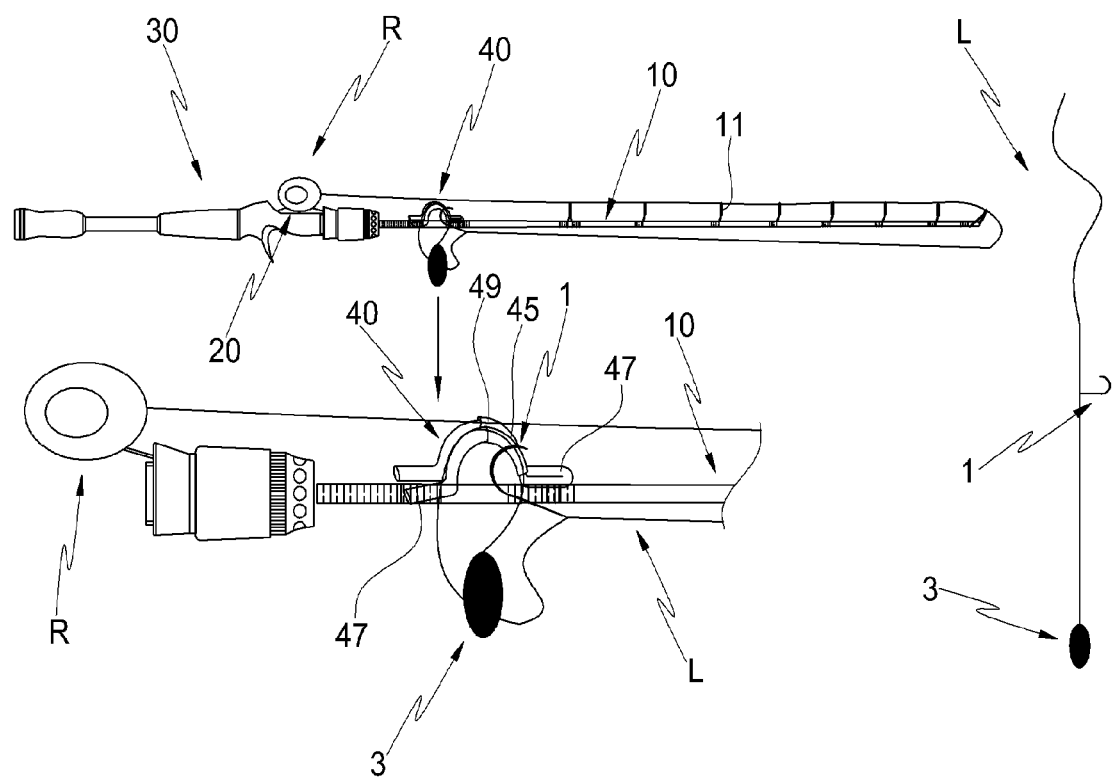
FIGS. 11, 12A to 12B and 13A to 13B illustrate a first modification of the fishing rod according to the present invention in side views, perspective views and sectional views.
Figure 12:
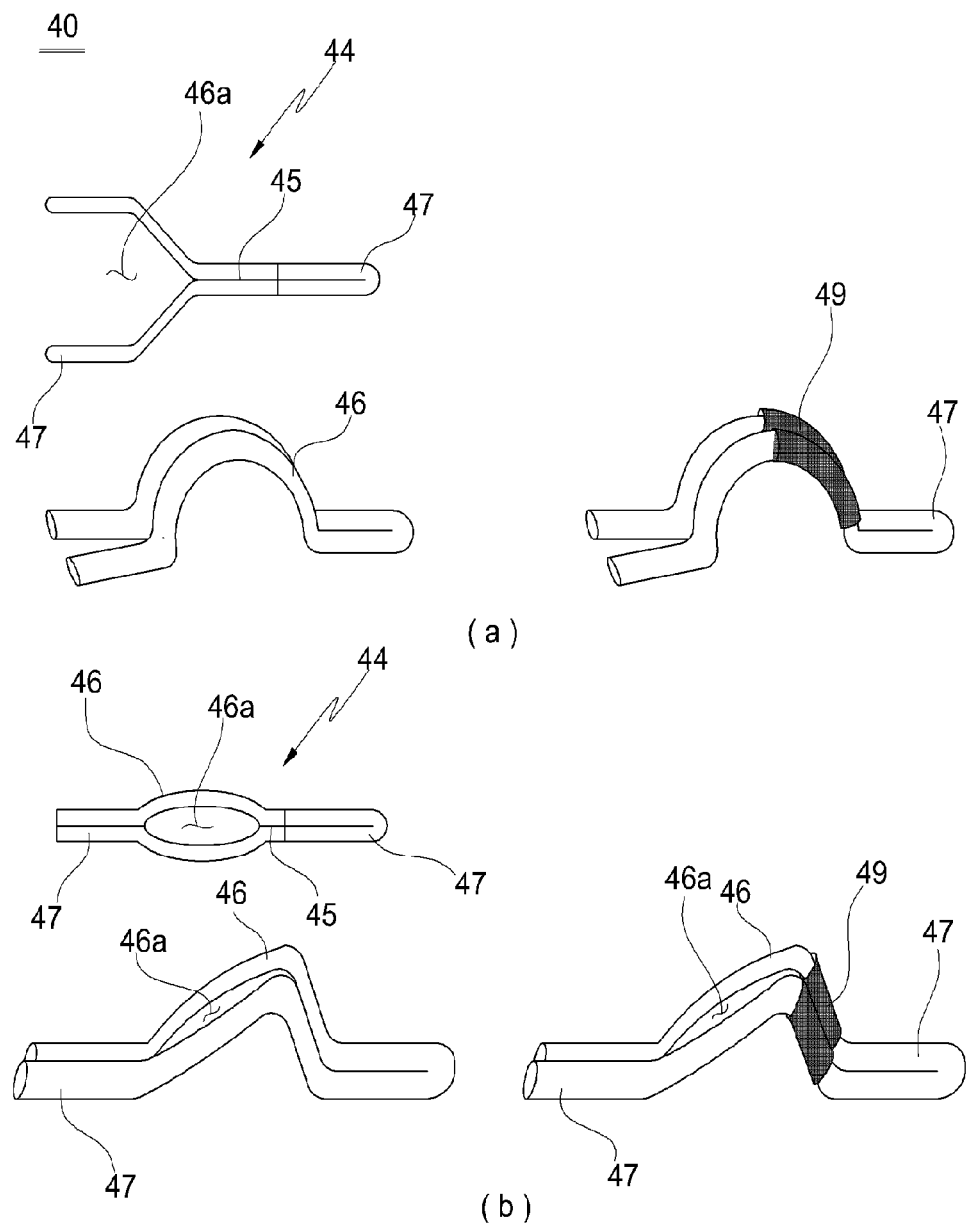
Figure 13:
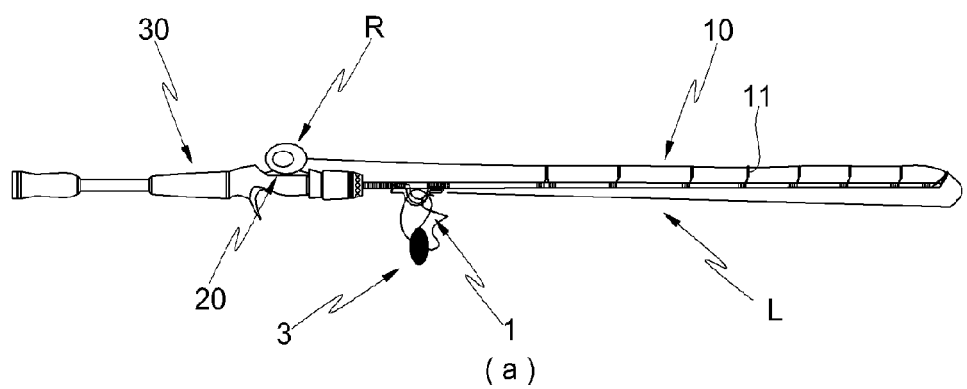
Figure 13:
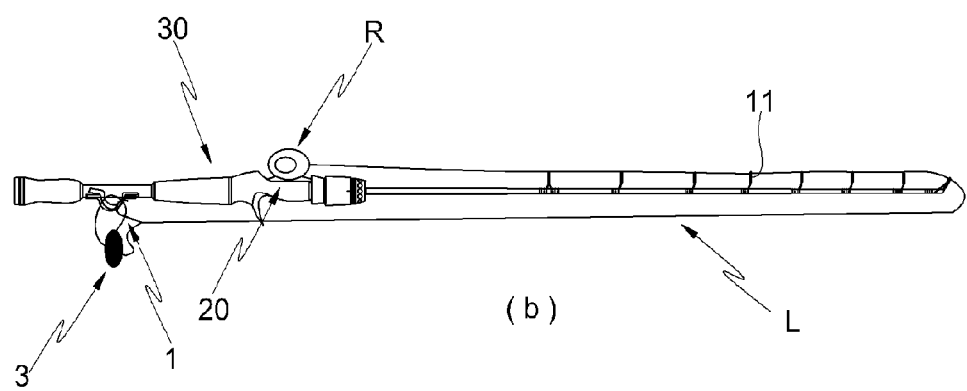

FIGS. 11 to 13 show a first modification of the holding unit 40 according to the present invention.

As shown in the drawings, the holding unit 40 includes a holding body 44 that is made of an elastic material and has a branched structure. The holding body 44 includes a folded first mounting part 47 that is formed in the front of the holding body 44, a pressure part 45 that comprises two parts extending from ends of the folded first mounting part 47 while being in contact with each other, a support part 46 that comprises two parts extending from the two parts of the pressure part 45 while being spaced apart from each other, and a second mounting part 47 that comprises two parts extending from the two parts of the support part 46 while being bent.

Here, when the fishhook 1 or the fishline L around the sinker 3 is inserted into the pressure part 45, the pressure part 45 can elastically compress the fishhook 1 or the fishline L, thereby holding the fishhook 1 or the fishline L.

Further, the first and second mounting parts 47 are mounted to the hand grip 30 or to the elastic rod part 10.

Here, a wire (not shown) or a clamp (not shown) may be used to mount the mounting parts 47 to the hand grip or to the elastic rod part.

Further, a space 46a is defined between the two parts of the support part 46.

When it is required to insert the fishhook 1 or the fishline L into the pressure part 45, the fishhook 1 or the fishline L can be easily inserted into the pressure part 45 through the space 46a, so that the present invention can improve use efficiency of the fishing rod.

Figure 14:
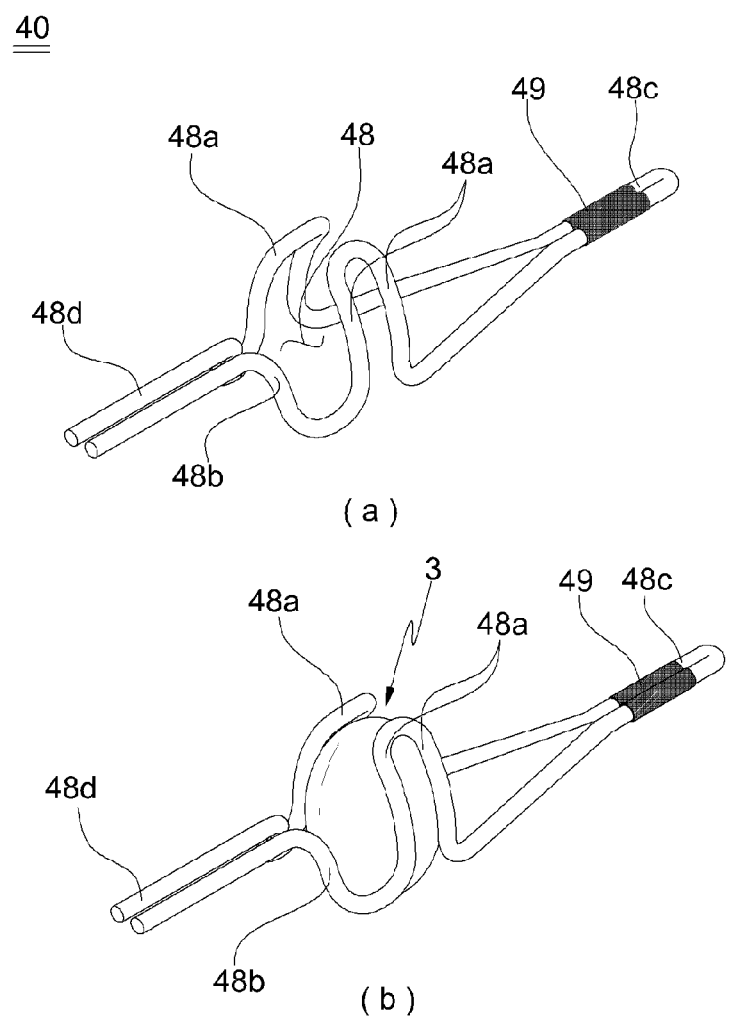
FIGS. 14A to 14B illustrates a second modification of the fishing rod according to the present invention in perspective views.

FIG. 14 shows a second modification of the holding unit 40 of the present invention.

As shown in FIG. 14, the holding unit 40 includes a sinker receiver 48 that receives the sinker 3 therein, a side surface support member 48a that holds opposite sides of the sinker 3, a front surface support member 48b that holds the front of the sinker 3, a contact part 48c that extends from the side surface support member 48a, and a mounting part 48d that extends from the front surface support member 48b and is mounted to the hand grip 30 or to the elastic rod part 10.

Here, the side surface support member 48a that supports the opposite sides of the sinker 3 is specifically curved so that when the sinker 3 is placed in the sinker receiver 48, the holding unit 40 can more efficiently hold the sinker 3 by the side surface support member 48a.

The front surface support member 48b functions to support the lower part of the front part of the sinker 3, thereby preventing the sinker 3 from being undesirably removed forward from the holding unit 40.

When the fishhook 1 or the fishline L around the fishhook or around the sinker 3 is inserted into the contact part 48c, the contact part 48c can elastically hold the fishhook 1 or the fishline L, thereby realizing an efficient holding structure of the holding unit 40.

As shown in FIGS. 12 and 14, to prevent the fishhook 1 and the fishline L from slipping or to protect the fishhook 1 and the fishline L from damage, it is preferred that each of the pressure part 45 and the contact part 48c be covered with a protective member 49 that is made of an elastic material having a high coefficient of friction.

Further, although it is not shown in the drawings, the side surface support member 48a or the front surface support member 48b that supports the sinker be covered with a friction member so that the sinker received in the sinker receiver can come into contact with the friction members of the support members 48a and 48b, thereby being prevented from unexpectedly removed from the sinker receiver.

Figure 15:
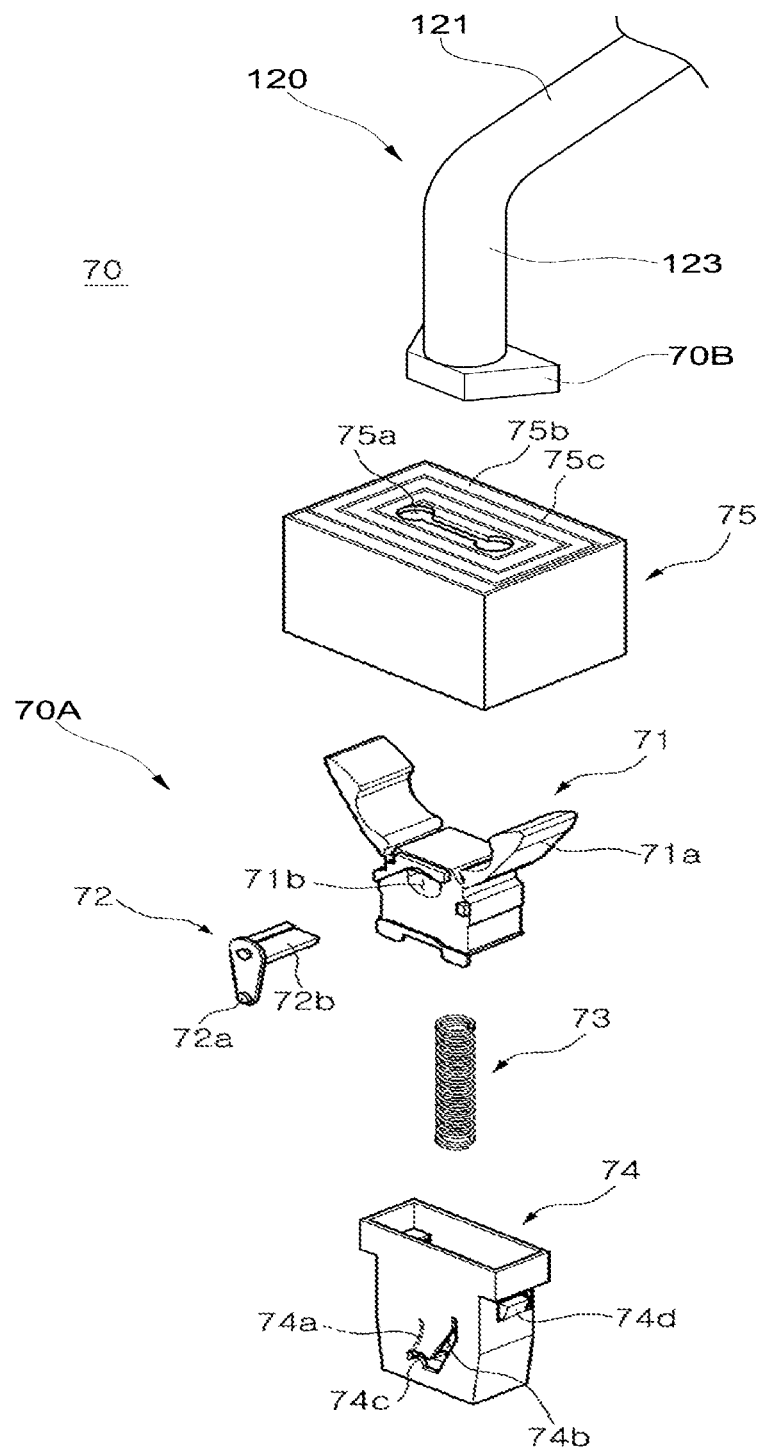
FIGS. 15 to 17 are perspective views illustrating modifications of a fishhook hanger keeping unit according to the present invention.
Figure 16:
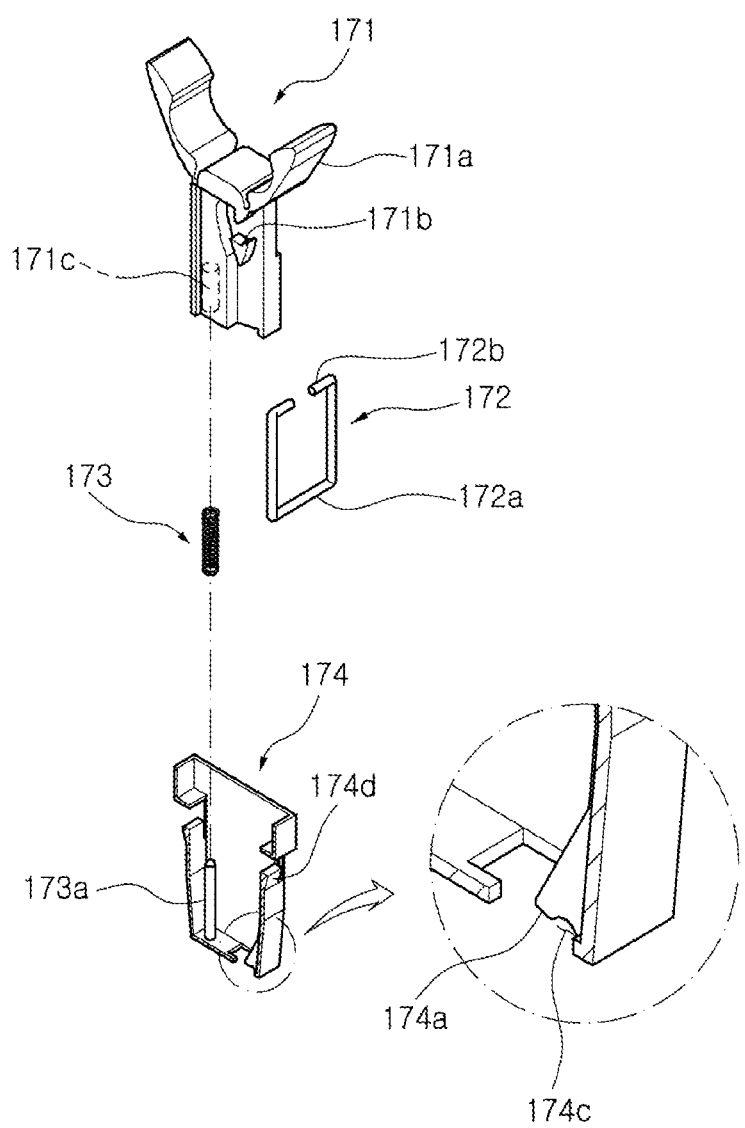
Figure 17:
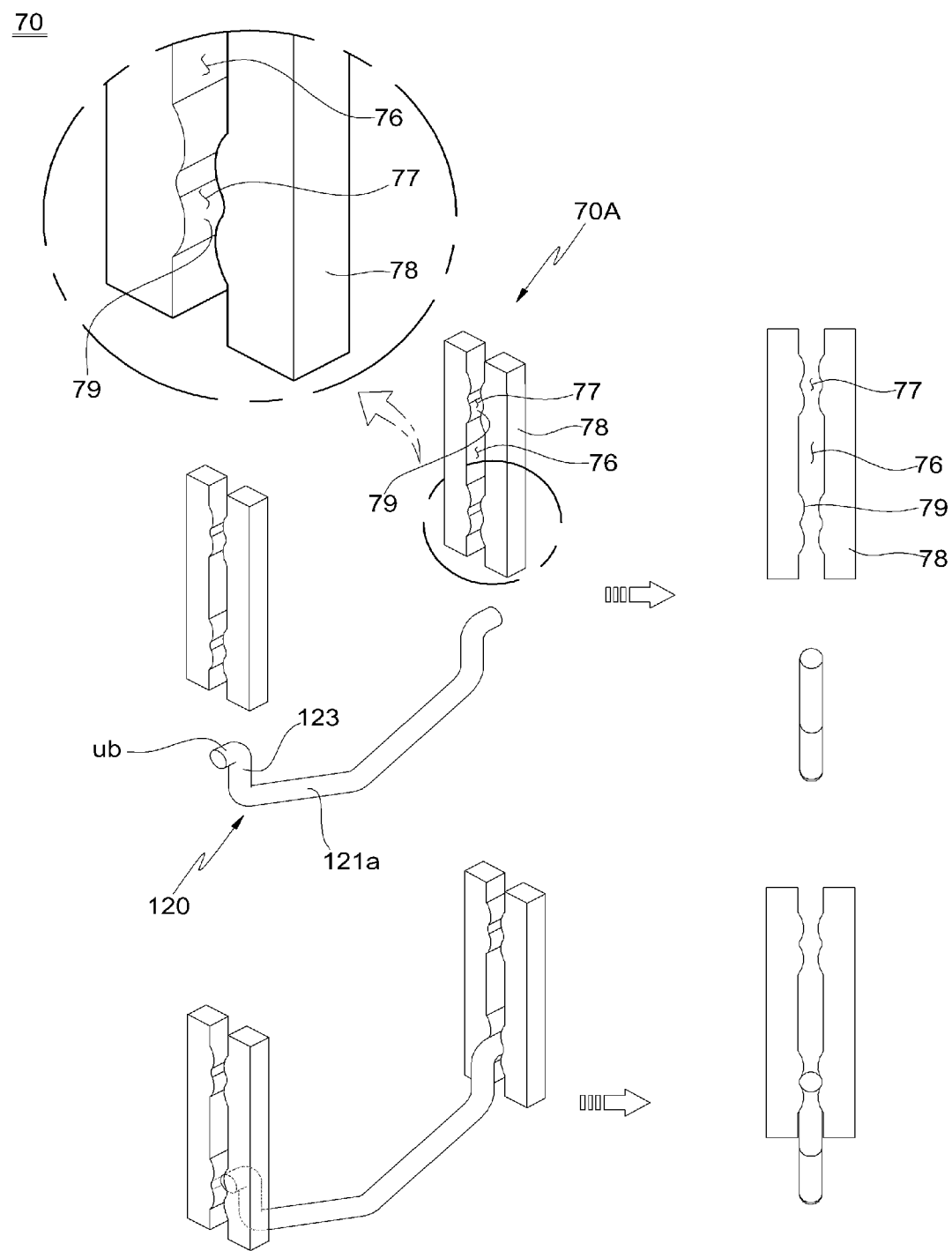

As shown in FIGS. 15 to 17, the reel body R of the present invention may be provided with a fishhook hanger keeping unit 70 that can keep the fishhook hanger 120 therein.

In other words, the fishhook hanger keeping unit 70 of the present invention can be used to keep the fishhook hanger 120 in the reel body R when the fishhook hanger 120 is not in use or to eject the fishhook hanger 120 from the reel body R when it is required to use the fishhook hanger 120, so that the fishhook hanger keeping unit 70 can prevent the fishhook hanger 120 from being lost when the fishhook hanger 120 is mounted to or removed from the fishing reel. Further, the fishhook hanger keeping unit 70 can prevent the fishhook hanger 120 from disturbing the user when the user uses the fishing rod, thereby improving the use efficiency of the fishing rod.

The fishhook hanger keeping unit 70 includes a guide unit 70A that is provided in the reel body so as to receive or eject the fishhook hanger 120 in or from the reel body. The guide unit 70A may be formed as a rail structure that is provided in the locking part ua of the reel body R. The rail-shaped guide unit 70A may be provided with a stop member that can prevent the fishhook hanger 120 from being undesirably retracted or undesirably ejected. For example, the stop member may be formed as a pad that is made of rubber having a high coefficient of friction and is provided on the rail structure.

Particularly, when the locking parts of fishhook hanger 120 are formed as the protrusion-shaped male locking parts ub, a rail structure and a stop member that correspond to the male locking parts ub may be used. An example of the rail structure and the stop member that correspond to the male locking parts ub may be configured in a manner described in FIG. 17.

The fishhook hanger keeping unit 70 includes guide units 70A that are provided in the inner surfaces of the respective side covers 101 of the reel body so as to face each other, and locking protrusions 70B that are formed on the ends of the connection parts 123 of the fishhook hanger 120. Here, each of the guide units 70A has a case 74, an outer surface of which is connected to the inner surface of an associated side cover 101.

The guide unit 70A includes a hook unit 71. Here, the locking protrusions 70B and the hook unit 71 of the guide unit 70A are configured such that, when the fishhook hanger 120 is biased in a direction to the guide unit 70A, the locking protrusion 70B that is engaged with elastic locking parts 71a of the hook unit 71 can press the hook unit 71, so that a locking protrusion 72a of a guide lever 72, which has been placed in an insert hole 71b of the hook unit 71 and has been biased by a compressed spring 73, can be released from a stopping hole 74c of the case 74 along an unlocking guide slit 74b.

A stopper 74d is formed in each of opposite side walls of the case 74 of the guide unit 70A so that locking pieces (not shown) that are formed in the side covers can be forcibly locked to the stoppers 74d, thereby accomplishing the arrangement of the guide unit 70A.

Further, the hook unit 71 that is biased by the spring 73 in the case 74 holds the locking protrusion 70B by the elastic locking parts 71a.

An insert protrusion 72b of the guide lever 72 is inserted into the insert hole 71b of the hook unit 71 so that the guide lever 72 can be rotatably combined with the hook unit 71.

Here, when the insert protrusion 72b of the guide lever 72 is compressed by the upper end of the spring 73, the locking protrusion 72a of the guide lever 72 can be placed at a location eccentric from the center of the case 74 to the right in the drawings due to specific shapes of both the insert protrusion 72b of the guide lever 72 and the insert hole 71b of the hook unit 71.

Due to the eccentric position of the locking protrusion 72a of the guide lever 72, the spring 73 elastically extends and the elastic locking parts 71a of the hook unit 71 are released from the case 74 so that the locking protrusion 70B can be released from the elastic locking parts 71a of the hook unit 71.

In the above state, when the fishhook hanger 120 is biased in a direction toward the guide unit 70A, the locking protrusion 70B comes into contact with the hook unit 71 and moves the hook unit 71 downward so that the locking protrusion 72a of the guide lever 72 moves downward along an inclined locking guide rail 74a of the case 74. Here, when the locking protrusion 72a of the guide lever 72 reaches the stopping hole 74c that is formed in the center of the case 74, the locking protrusion 72a is stopped so that the locking protrusion 70B is caught by the elastic locking parts 71a of the hook unit 71. Accordingly, the fishhook hanger 120 is held by the guide units 70A.

When the fishhook hanger 120 in the above state is biased again, the locking protrusion 70B presses the hook unit 71 and the guide lever 72 is released from the state in which the guide lever 72 has been restricted by the stopping hole 74c so that the locking protrusion 72a of the guide lever 72 is biased to the right due to the compression of the spring 73 and due to the specific structure of both the insert hole 71b of the hook unit 71 and the insert protrusion 72b.

When a biasing force is removed from the fishhook hanger 120, the locking protrusion 72a of the guide lever 72 moves upward along the unlocking guide slit 74b of the case 74 due to the restoring force of the spring 73.

Therefore, the elastic locking parts 71a of the hook unit 71 release the locking protrusion 70B.

Further, as shown in FIG. 15, the fishhook hanger keeping unit 70 further includes an outer casing 75 that prevents foreign substances from being introduced to the guide unit 70A.

The outer casing 75 covers the guide unit, and is provided on an upper surface thereof with a dumbbell-shaped insert slit 75a through which the locking protrusion 70B can pass.

In the upper surface of the outer casing 75, thin parts 75b and thick parts 75c are repeatedly formed, thereby giving an appropriate elasticity to the upper surface of the outer casing 75 and minimizing the size of the insert slit 75a of the outer casing, and efficiently preventing the introduction of the foreign substances to the guide unit 70A.

Even when the locking protrusion 70B comes into contact with the peripheral area of the insert slit 75a of the outer casing 75, the upper part of the outer casing 75 can be prevented from being caught by the hook unit 71 due to the locking protrusion 70B.

The fishhook hanger keeping unit 70 may be variously designed using a conventional technique.

For example, FIG. 16 illustrates a guide unit 170A that can solve the problem of the guide unit 70A of FIG. 15 in which the durability of the guide lever 72, particularly, the durability of the locking protrusion 72a of the guide lever 72 is low.

The guide unit 170A includes a hook unit 171, a guide lever 172, a spring 173, and a case 174.

The guide lever 172 is formed by bending an elastic linear member such that a lock part 172a forms a lower part of the guide lever 172 and a rotating shaft 172b forms an upper part of the guide lever 172.

In the hook unit 171, the construction of the elastic locking parts 171a remains the same as that of FIG. 12. However, due to the change in the structure of the guide lever, a locking part, particularly, a locking groove 171b is formed in each side of the hook unit 171 so that the rotating shaft 172b of the guide lever 172 can be rotatably locked to the hook unit 171.

The spring 173 is inserted into a spring insert hole 171c that is formed in the left side of the lower body of the hook unit 171.

As shown in the sectional view, a spring support protrusion 173a is provided in the case 174 at a location corresponding to the spring 173.

A locking-unlocking rail 174a is formed along the lower surface of a wedge-shaped protrusion (not designated) that is provided on the right-sided inner surface of the case 174 so as to cooperate with the guide lever 172.

A stopping groove 174c is formed in the right end of the rail 174a.

Further, stoppers 174d are formed on opposite side surfaces of the case 174 so as to hold the locking parts 171a of the guide unit 170A.

Here, the hook unit 171 is placed above relative to the case 174 so that, when the hook unit 171 moves downward while compressing the spring 173 in a state in which the hook unit 171 is not engaged with the locking protrusion of the fishhook hanger, the elastic locking parts 171a are closed by the case 174.

In the above state, the guide lever 172, the rotating shaft 172b of which is rotatably held by the hooking grooves 171b of the hook unit 171, moves downward along the wedge-shaped protrusion of the case 174, so that the guide lever 172 gradually leans to the left from a vertically standing position.

When the lock part 172a of the guide lever 172 reaches the start point of the locking-unlocking rail 174a that is placed in the lowermost position of the wedge-shaped protrusion, the inclination of the guide lever 172 becomes the maximum inclination.

Here, the rail 174a has an inclined shape so that when the lock part 172a of the guide lever 172 moves further to a position below the start point of the rail, the lock part 172a is released from the wedge-shaped protrusion and the guide lever 172 intends to be turned by the gravity and to stand vertically. Accordingly, the guide lever 172 is turned to the right around the rotating shaft 172b and inertially moves to the right beyond the vertically standing position, thereby being placed below the stopping groove 174c.

In the above state, when a pressure that has been applied to the hook unit 171 is released momentarily, the spring 173 is extended and the lock part 172a of the guide lever 172 is caught by the stopping groove 174c.

Here, the locking parts 171a of the hook unit 171 that are restricted by the case 174 hold the locking protrusion of the fishhook hanger.

When the fishhook hanger 120 is pressed or when the hook unit 171 is pressed, the lock part 172a of the guide lever 172 is released from the stopping groove 74c and the guide lever 172 stands vertically by the gravity, so that the lock part 172a of the guide lever 172 is placed below the locking-unlocking rail 174a.

When the pressure that has been applied to the hook unit 171 is removed from the hook unit 171, the hook unit 171 moves upward by the restoring force of the spring 173.

Accordingly, the lock part 172a of the guide lever 172 slides along the inclined surface of the rail 174a and removes from the wedge-shaped protrusion, so that the hook unit 171 moves upward relative to the case 174 and the elastic locking parts 171a are opened, thereby releasing the locking protrusion of the fishhook hanger.

Here, the outer casing of FIG. 15 may be used in the guide unit of FIG. 18.

Further, the fishhook hanger keeping unit of the present invention may be manually operated to receive or eject the fishhook hanger in or from the eel body, in addition to the above-mentioned one-touch manner for receiving or ejecting the fishhook hanger.

To form the fishhook hanger keeping unit that can manually receive or eject the fishhook hanger, the guide unit 70A of the fishhook hanger keeping unit 70 includes a guide groove 76 that is defined by horizontal grooves formed on the inner surfaces of the opposite side covers 101, and insert grooves 77 that are formed in opposite ends of the guide groove 76, as shown in FIG. 17.

In other words, guide blocks 78 are connected to the inner surfaces of the respective side covers 101 and the guide groove 76 is defined between the opposite guide blocks 78.

Further, the insert grooves 77 are formed between the guide blocks 78 at ends of the guide blocks 78.

In other words, the insert grooves 77 are formed between the guide blocks 78 at the ends of the guide blocks 78 so that the male locking parts ub of the fishhook hanger 120 can be forcibly inserted into the insert grooves 77.

Here, to prevent the male locking parts ub from being undesirably removed from the insert grooves 77 when the male locking parts ub are completely inserted into the insert grooves 77, it is preferred that stop protrusions 79 be formed on the facing surfaces of the respective guide blocks 78 so that the male locking parts ub can be more efficiently held in the insert grooves 77.

The male locking parts ub of the fishhook hanger 120 can move along the guide groove 76.

Further, when the fishhook hanger 120 is ejected, the front insert groove 77 can firmly hold the male locking parts ub, thereby efficiently holding the fishhook hanger 120 in a state in which the fishhook hanger 120 has been ejected.

Further, when the fishhook hanger 120 is received in the reel body, the rear insert groove 77 can firmly hold the male locking parts ub, thereby efficiently holding the fishhook hanger 120 in a state in which the fishhook hanger 120 has been received.

Here, to manually receive or eject the fishhook hanger 120 using the above-mentioned fishhook hanger keeping unit, the user can receive the fishhook hanger 120 by pulling the fishhook hanger 120 or can eject the fishhook hanger 120 by pushing the fishhook hanger 120.

Further, a wall may be provided in the center of the locking hole uh of the support 113 so that when the fishhook hanger 120 is received in the reel body using the fishhook hanger keeping unit 70, the wall can prevent the fishhook hanger from being completely retracted into the locking hole 113.

Therefore, when it is required to eject the fishhook hanger 120, the user can easily hold the fishhook hanger 120 with fingers so that the operational efficiency of the present invention can be improved.

Although preferred embodiments of the fishing reel equipped with the removable fishhook hanger and the fishing rod using the fishing reel according to the present invention have been described for illustrative purposes, those skilled in the art will appreciate that various modifications, additions and substitutions are possible, without departing from the scope and spirit of the invention as disclosed in the accompanying claims.

What is claimed is:

1. A fishing rod, comprising:
    an elastic rod part provided with a plurality of fishline guides;
    a reel seat connected to an end of the elastic rod part, with a reel body mounted to the reel seat;
    a hand grip connected to the reel seat at a location in front, in back, or in front and back of the reel seat; and
    a holding unit connected to the hand grip, the elastic rod part, or both the hand grip and the elastic rod part, the holding unit holding at least one of a part of the fishline connected to the reel body, a fishhook connected to the fishline, and a part of the fishline adjacent to the fishhook, the holding unit further holding at least one of a sinker connected to an end of the fishline, and a sinker holder connecting the sinker and the fishline to each other,
    wherein the holding unit includes: a sinker receiver receiving the sinker or sinker holder therein, wherein the sinker receiver includes a side surface support member curved to hold opposite sides of the sinker or sinker holder, a front surface support member extending from one end of the side surface support member and curved to support a lower front part of the sinker or sinker holder thereby preventing the sinker or sinker holder from being removed forward from the holding unit;
    a mounting part extending from the front surface support member and attached to the hand grip or to the elastic rod part; and
    a contact part extending from the other end of the side surface support member and bent in such a manner that bent portions of the contact part are elastically in contact with each other so that the fishhook, the part of the fishline adjacent to the fishhook, or a part of the fishline adjacent to the sinker is inserted into the contact part, and the contact part elastically grips the fishhook or the fishline; and
    a protective member made of an elastic material covering the contact part to prevent the fishhook and the fishline from slipping from the contact part or to protect the fishhook and the fishline from damage, and
    wherein the sinker receiver, the mounting part and the contact part form an integral single piece.

* * * * *